UNITED STATES PATENT OFFICE.

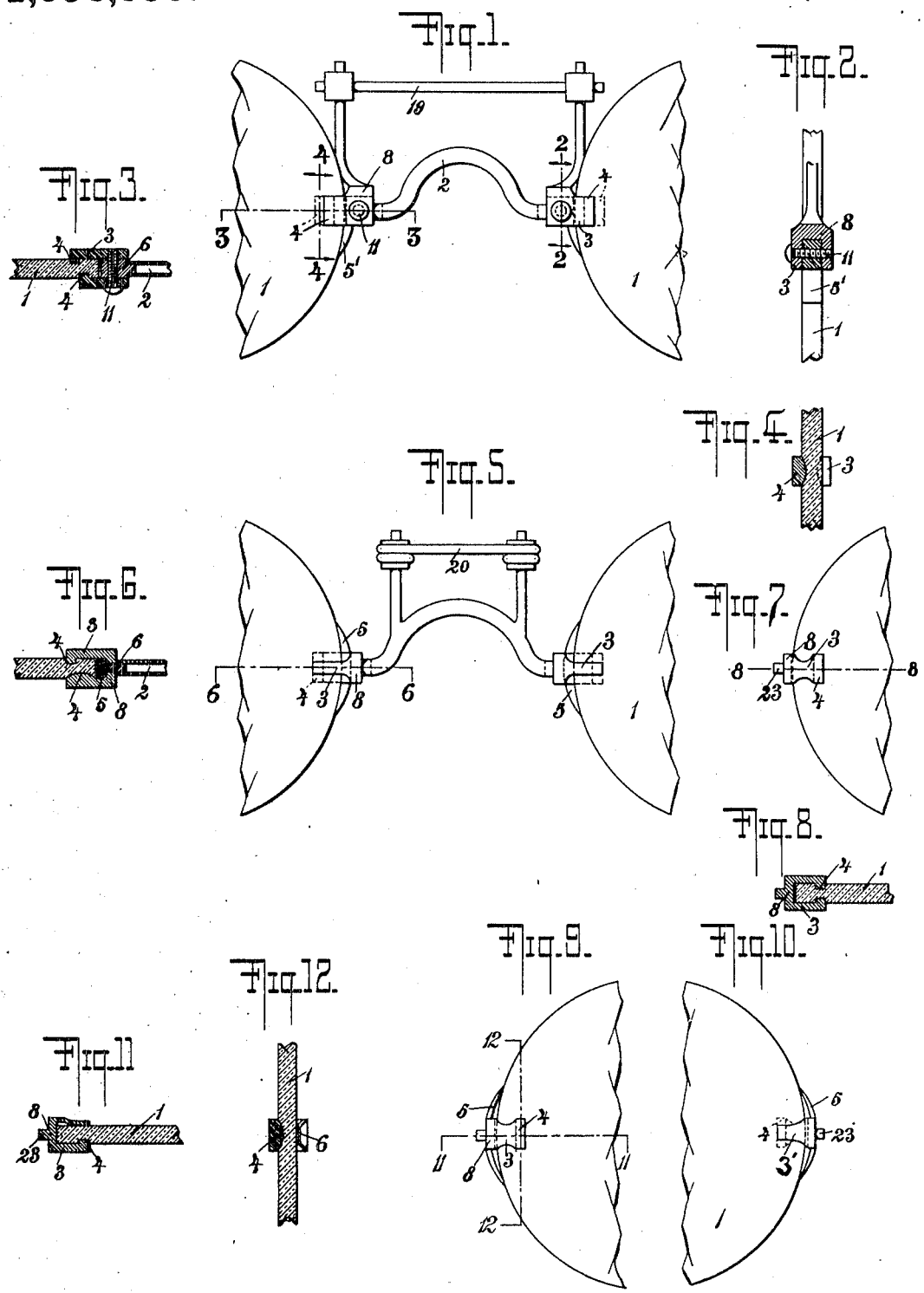

FRIEDRICH PELS-LEUSDEN, OF BERLIN, GERMANY.

BRIDGE-CONNECTING CLIP FOR RIMLESS EYEGLASSES.

1,096,858.  Specification of Letters Patent.  Patented May 19, 1914.

Continuation of application Serial No. 688,860, filed April 6, 1912. This application filed October 29, 1912. Serial No. 728,382.

*To all whom it may concern:*

Be it known that I, FRIEDRICH PELS-LEUSDEN, a subject of the Emperor of Germany, and a resident of Berlin, Germany, have invented certain new and useful Improvements in Bridge-Connecting Clips for Rimless Eyeglasses, of which the following is a specification.

My invention relates to eyeglasses and particularly to eyeglasses having partial rims or frames, often called "rimless" glasses, and has for its object to provide a construction by means of which such frames may be fastened to the lenses without drilling said lenses.

A further object of my invention is to provide a construction as aforesaid which can be employed with very little risk of breaking the lenses and which, furthermore, insures the lenses being held very snugly and without play.

A still further object of the invention is to provide a construction as the aforesaid, which will permit the rim to be easily and quickly attached to or detached from the lenses.

Further objects will appear as the specification proceeds.

While I have entitled and am about to describe my invention as applied to eyeglasses, the same is equally useful and applicable to spectacles, and I intend the claims to cover the invention thus fully. This application is, in part, a continuation of my pending application, Serial No. 668,860 filed April 6, 1912.

My invention will be best understood by referring to the drawings accompanying in which—

Figures 1 to 4 represent an eyeglass embodying one form of my invention, Fig. 1 showing a front elevation; Fig. 2 a vertical section taken along line 2—2 of Fig. 1; Fig. 3 a horizontal section taken along the line 3—3 of Fig. 1 and Fig. 4 a vertical section taken along the line 4—4 of Fig. 1. Fig. 5 represents an elevation, similar to Fig. 1, and Fig. 6 a horizontal section, taken along the line 6—6 of Fig. 5 of a modified form of my invention. Fig. 7 represents a front elevation and Fig. 8 a section, taken along the line 8—8 of Fig. 7, of still another modification of my invention, and Figs. 9–12 show still a fourth modification of my invention, Fig. 9 showing the rim connection in elevation from one side of the eyeglass, Fig. 10 similarly showing the same connection from the other side of the eyeglass, Fig. 11 being a section taken along the line 11—11 of Fig. 9 and Fig. 12 being a section taken along the line 12—12 of Fig. 9.

Referring to the drawings, the lenses 1 are connected together by a bridge 2, each end of which is provided with a pair of resilient ears 3 which extend over and embrace the lens. These ears are provided with inwardly projecting tongues 4 which engage corresponding slots previously ground into the lens from the sides thereof. These slots (and of course the tongues 4) are preferable crescent shaped or segments of a circle, in which case they are readily formed in the lens by use of a suitable carborundum or orther grinding wheel; other forms of slots and tongues 4 may, however, be employed.

Ordinarily the resiliency of the ears 3 will hold the tongues 4 in their slots with sufficient tightness. Additional security may be obtained, however, by use of the form shown in Figs. 1 to 4, where the ears 3 are attached by means of a screw 11, lying outside of the lens, to a connecting piece 6 having substantially the thickness of the lens and provided with a teat over which the end of bridge 2 is fitted and to which said bridge end is welded or otherwise suitably fastened. In this particular form also, the two tongues 4 which grip a single lens are parallel with but slightly offset with reference to one another instead of being directly opposed. In this way, the lens is not unduly weakened at any one point.

Each connecting piece 6 has extending from its lower side a resilient lobe 5 which contacts closely with the lens and from its upper side a stem 8 having a portion resiliently abutting against the lens edge and carrying an upper bridge 19 at the top. This type of construction is especially adapted to the eyeglass with adjustable upper bridge shown in my pending application, Serial No. 659,502, filed November 10, 1911, because the parts may be easily exchanged for others so as to suit the needs of individual customers.

In the form shown in Figs. 5 and 6, the ears 3 are formed integral with a cross bar 8. In assembling the eyeglasses, a piece having substantially the thickness of the lens and provided with upper and lower lobes 5 contacting closely against the edge of the lens, is inserted between the ears 3 and has one end of the connecting piece 6, passing through the cross bar 8, and inserted into it, the other end of piece 6 being inserted into the end of bridge 2 and welded or otherwise suitably connected thereto. The tongues 4 are here placed at right angles to one another instead of parallel as in the case of the modification shown in Figs. 1 to 4, thus providing a construction in which the lenses are less weakened than is the case in the construction shown in Figs. 1 to 4. The upper bridge 20 is made resilient and joined directly to the fixed nose bridge.

In the modification shown in Figs. 7 and 8, the cross piece 8, the ears 3, the tongues 4 and the lobes (not shown) 5 are all integral; a teat 23 is provided over which the bridge 2 is to be fitted and welded, or otherwise suitably attached. In this modification, the tongues 4 are parallel and directly opposite to one another.

In the modification shown in Figs. 9 to 12, a tongue 4 and corresponding slot is provided for on but one side of each lens. On the other side of the lens a resilient clip 3', which presses against the flat surface of the lens, is substituted for the usual resilient ear 3 and tongue 4. The general type of construction used here is similar to that used in the form shown in Figs. 7 and 8, i. e., ear 3, clip 3' and lobes 5 are integral with a cross-bar 8, provided with a teat to which is attached the end of bridge 2.

The arrangement of lens held between a tongue and slot on one side and a plain clip on the other side (Figs. 9 to 12) weakens the glass least of the several constructions shown.

The slots required for engaging the tongues 4 may, as already stated, best be formed by grinding them upon the face of the lens with a carborundum or other suitable grinding disk. The axis of this disk should, while the grinding is going on, be parallel to or inclined at a slight angle with the plane of the lens. If the disk have parallel sides the slot produced will be a parallel sided slot; in some cases it may be preferable to use a disk whose sides are somewhat wedge-shaped, i. e., inclined to one another somewhat, as in this way the walls of the resultant slot are less liable to break down.

Owing to the fact that both slot and tongue have an elongated rectangular section, there can be no rotatory play of the lenses relative to the mountings (i. e. the tongues) if tongues and slots are reasonably well determined and fitted. This is especially true when tongues and slots are wedge shaped as above referred to and the tongue made so that it will not quite reach to the bottom of the slot. This freedom from rotatory play is secured in eyeglasses made according to my invention even when the lobes 5 are omitted.

As compared with rim connections having tongues which engage slots formed in the edge of the lens, the rim connections of my invention herein described may be made more cheaply and will have less weight.

In the constructions shown in Figs. 1 to 4 and Figs. 7 and 8, the lenses may be easily and quickly attached to the mounting owing to the fact that the central parts of the tongues 4 lie closer to one another than do their extremities. The lens should be pushed into or out of the clips in the direction of the length of the tongues.

I do not wish to confine my invention to the specific details herein shown as many changes may be made without departing from the spirit thereof.

I claim:

1. Eyeglasses or spectacles comprising, in combination, lenses provided with crescent shaped slots, a mounting provided with tongues shaped to fit said slots and means for retaining said tongues in said slots.

2. Eyeglasses or spectacles comprising, in combination, lenses provided with crescent shaped slots, a mounting provided with tongues shaped to fit said slots, and resilient means for retaining said tongues in said slots.

3. Eyeglasses or spectacles comprising, in combination, lenses provided with crescent shaped slots, a mounting provided with resilient ears, and projections upon said ears engaging said slots.

4. Eyeglasses or spectacles comprising, in combination, lenses provided with crescent shaped slots, a bridge, tongues shaped to fit and engaging said slots, resilient ears supporting said tongues and means outside of said lenses to connect ears and bridge together.

5. Eyeglasses or spectacles comprising, in combination, lenses provided with crescent shaped slots, a bridge, tongues shaped to fit and engaging said slots, resilient ears supporting said tongues and screws outside of said lenses to connect ears and bridge together.

6. In an eyeglass or spectacle the combination of a lens provided with a crescent shaped slot upon one side and near one edge thereof, and a mounting provided with a resiliently supported tongue shaped to fit said slot and a resilient clip opposed to said tongue and arranged to retain said tongue in said slot.

7. In an eyeglass or spectacle, the combination of a lens provided with a crescent shaped parallel sided slot at right angles to its face and near an edge thereof, a mounting provided with a resiliently supported tongue having the same shape as the slot and means opposed to said tongue for retaining it in said slot.

In testimony whereof I have hereunto set my hand in the presence of two subscribing witnesses.

FRIEDRICH PELS-LEUSDEN.

Witnesses:
 HENRY HASPER,
 WOLDEMAR HAUPT.